United States Patent
Iyer et al.

(10) Patent No.: US 12,223,331 B2
(45) Date of Patent: Feb. 11, 2025

(54) INTERACTIVE PRE-BOOT INTELLIGENCE USING ADAPTIVE ROW

(71) Applicant: Dell Products L.P., Round Rock, TX (US)

(72) Inventors: Vivek Viswanathan Iyer, Austin, TX (US); Sajjad S. Ahmed, Austin, TX (US); Nikhil Gudikandula, Houston, TX (US)

(73) Assignee: Dell Products L.P., Round Rock, TX (US)

( * ) Notice: Subject to any disclaimer, the term of this patent is extended or adjusted under 35 U.S.C. 154(b) by 169 days.

(21) Appl. No.: 17/489,447

(22) Filed: Sep. 29, 2021

(65) Prior Publication Data

US 2023/0094846 A1    Mar. 30, 2023

(51) Int. Cl.
*G06F 9/4401*    (2018.01)
(52) U.S. Cl.
CPC ............ *G06F 9/4405* (2013.01); *G06F 9/441* (2013.01)
(58) Field of Classification Search
CPC ...... G06F 9/4405; G06F 9/441; G06F 9/4403; G06F 11/2247
See application file for complete search history.

(56) References Cited

U.S. PATENT DOCUMENTS

| | | | |
|---|---|---|---|
| 2013/0042098 A1* | 2/2013 | Baik | G06F 9/445 713/2 |
| 2015/0169495 A1* | 6/2015 | Zheng | G06F 13/4221 710/315 |
| 2015/0261277 A1* | 9/2015 | Park | G06F 3/1229 713/323 |
| 2018/0107490 A1* | 4/2018 | Poornachandran | G06F 1/3287 |
| 2018/0210526 A1* | 7/2018 | Lee | G06F 1/266 |
| 2018/0285121 A1* | 10/2018 | Lambert | G06F 9/4405 |
| 2018/0293204 A1* | 10/2018 | Packer Ali | G06F 1/3293 |
| 2019/0004816 A1* | 1/2019 | Khatri | G06F 9/4403 |
| 2019/0007278 A1* | 1/2019 | Singh | H04L 67/10 |

* cited by examiner

*Primary Examiner* — Jaweed A Abbaszadeh
*Assistant Examiner* — Hyun Soo Kim
(74) *Attorney, Agent, or Firm* — Terrile, Cannatti & Chambers, LLP; Stephen A. Terrile

(57) ABSTRACT

A system, method, and computer-readable medium are disclosed for performing a pre-boot configuration operation. The pre-boot configuration operation includes performing a pre-boot system configuration operation using an ancillary integrated processor system, the pre-boot system configuration operation configuration certain parameters prior to initiation of a primary system boot operation; and, configuring an information handling system to automatically operate in a particular system configuration mode after performance of the pre-boot system configuration operation.

20 Claims, 11 Drawing Sheets

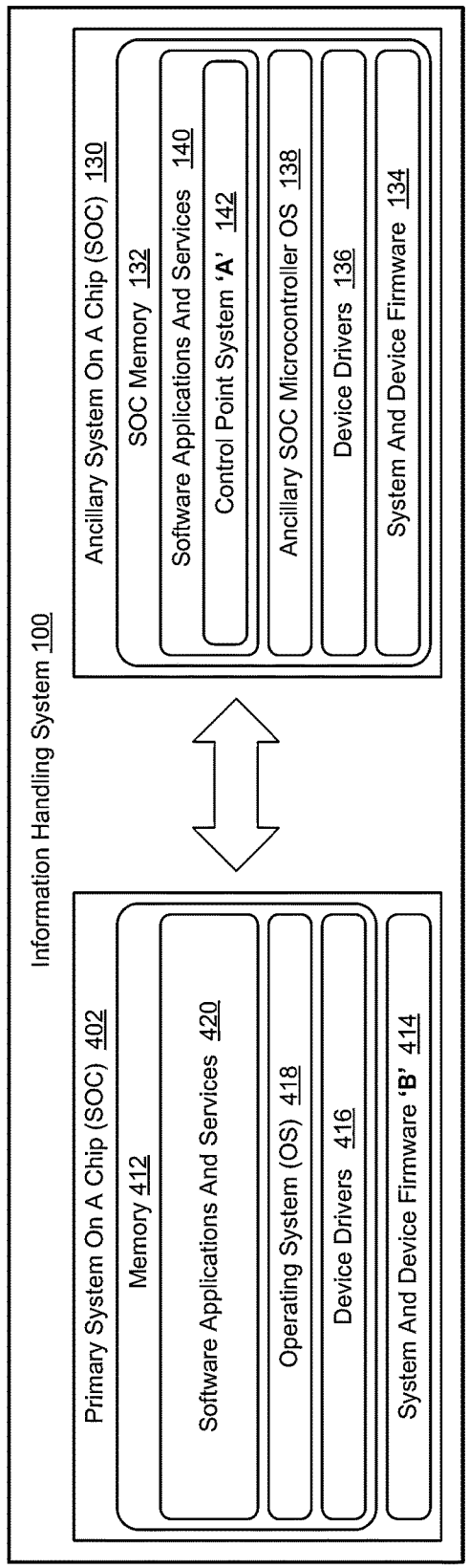

Figure 4

| System Configuration Mode 502 | System Attributes 504 | Operational Parameters 506 |
|---|---|---|
| Power Optimized 508 | • Low battery level<br>• Not connected to external power source<br>• Relatively new location or environment<br>• Multiple events scheduled in near-term | • Decrease display refresh rate<br>• Decrease display brightness<br>• Switch to different color profile<br>• Disable stereo sound<br>• Pause background system tasks<br>• Change power profile to conserve power |
| Performance Optimized 510 | • Home or work environment<br>• Not connected to external power source<br>• Camera focus mode enabled<br>• Active gaming | • Increase display refresh rate<br>• Increase display brightness if currently reduced<br>• Switch color profile<br>• Enable stereo sound<br>• Initiate background system tasks<br>• Change power profile to best performance |

Figure 5a

| System Configuration Mode 502 | System Attributes 504 | Operational Parameters 506 |
|---|---|---|
| Privacy Optimized 512 | <ul><li>More than one user detected</li><li>High environment background noise</li><li>Number of users changing frequently</li><li>New environment</li></ul> | <ul><li>Enable privacy screen</li><li>Close camera shutter</li><li>Minimize sound volume</li><li>Mute microphone</li></ul> |
| Entertainment 514 | <ul><li>Consume entertainment content</li><li>One-time or recurring</li></ul> | <ul><li>Increase display refresh rate</li><li>Increase display brightness if previously reduced</li><li>Switch color profile</li><li>Enable stereo sound</li><li>Prioritize entertainment traffic on WiFi/WWAN</li></ul> |
| Collaboration 516 | <ul><li>Detection of collaboration environment</li><li>More than one user detected</li><li>Low environment background noise</li><li>Number of user not changing frequently</li></ul> | <ul><li>Enable stereo sound</li><li>Set volume to optimal level for environment</li><li>Unmute microphone</li><li>Start live camera feed</li><li>Set display settings to extend mode</li><li>Disable privacy screen</li></ul> |
| Fast Boot 518 | <ul><li>Start-up at non-standard time</li><li>User intent to only perform one or two tasks</li></ul> | <ul><li>Disable start-up applications</li><li>Disable background system tasks</li><li>Delay full boot-up of hardware components</li><li>Change default display refresh rate</li></ul> |
| System Status 520 | <ul><li>Only check status of system components:<br>  - WWAN, WiFi, Bluetooth<br>  - Display properties<br>  - Microphone, speaker volume, camera mode<br>  - Privacy screen</li></ul> | <ul><li>Display status of system components</li></ul> |

*Figure 5b*

INTERACTIVE PRE-BOOT INTELLIGENCE USING ADAPTIVE ROW

BACKGROUND OF THE INVENTION

Field of the Invention

The present invention relates to information handling systems. More specifically, embodiments of the invention relate to performing a pre-boot system configuration operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a computer-implementable method for performing a pre-boot system configuration operation, comprising: providing an information handling system with a primary integrated processor system and an ancillary integrated processor system; performing a pre-boot system configuration operation using the ancillary integrated processor system, the pre-boot system configuration operation configuration certain parameters prior to initiation of a primary system boot operation; and, configuring the information handling system to automatically operate in a particular system configuration mode after performance of the pre-boot system configuration operation.

In another embodiment the invention relates to a system comprising: a primary integrated processor system; an ancillary integrated processor system; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: performing a pre-boot system configuration operation using the ancillary integrated processor system, the pre-boot system configuration operation configuration certain parameters prior to initiation of a primary system boot operation; and, configuring the information handling system to automatically operate in a particular system configuration mode after performance of the pre-boot system configuration operation.

In another embodiment the invention relates to a computer-readable storage medium embodying computer program code, the computer program code comprising computer executable instructions configured for: performing a pre-boot system configuration operation using an ancillary integrated processor system, the pre-boot system configuration operation configuration certain parameters prior to initiation of a primary system boot operation; and, configuring an information handling system to automatically operate in a particular system configuration mode after performance of the pre-boot system configuration operation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 shows a simplified block diagram of interactions between an ancillary system on a chip (SOC) and a primary SOC;

FIGS. 5a and 5b show a table of example information handling system (IHS) system configuration modes and their associated system attributes and operational parameters;

DETAILED DESCRIPTION

Figure 1:
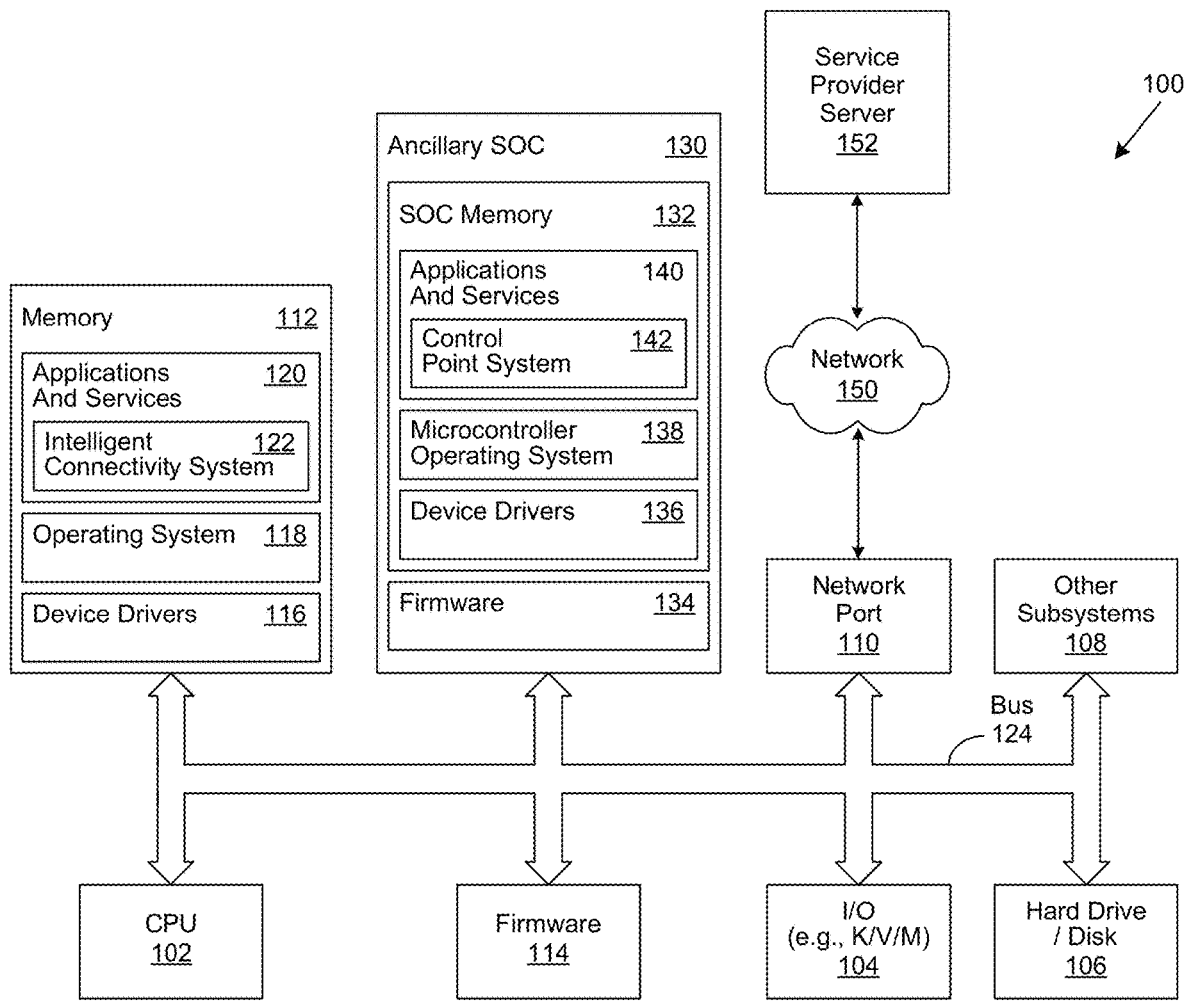
FIG. 1 shows a general illustration of components of an information handling system as implemented in the system and method of the present invention.

A system, method, and computer-readable medium are disclosed for performing a pre-boot system configuration operation. Certain aspects of the invention reflect an appreciation that there is an increasing need to efficiently and securely get data from where it may be stored or generated to where it is needed, whether that be in a collaboration room, a data center, in the cloud, on the network edge, or a combination thereof. Certain aspects of the invention likewise reflect an appreciation that there is a growing proliferation of network-enabled devices and network connectivity options. These network connectivity options include Personal Area Networks (PANs), such as Bluetooth, Wireless Local Area Networks (WLANs), such as Wireless Fidelity (WiFi) networks, Wireless Wide Area Networks (WWANs), such as 3G, 4G, and 5G cellular networks, satellite networks, and wired networks, such as traditional LANs, and Wide Area Networks (WANs), such as the Internet.

Certain aspects of the invention reflect an appreciation that today's network-enabled productivity, collaboration, work, and entertainment activities are increasingly occurring anywhere and at any time. Likewise, certain aspects of the invention reflect an appreciation that such activities are becoming a part of everyday life, and as a result, are leading to an increased expectation of network connectivity wherever and whenever needed. Certain aspects of the invention reflect an appreciation that users have likewise come to expect network connectivity, regardless of the underlying technology used to provide it, to be seamless, reliable, and secure.

Certain aspects of the invention reflect an appreciation that users of information handling systems are used to, and expect, being able to use their devices to interact anywhere, at any time. Certain aspects of the invention likewise reflect an appreciation that such interactions should ideally be simple and intuitive. However, some interactions, such as changing operating system (OS) and application settings, often require multiple steps, which can be time consuming and distracting.

Likewise, certain aspects of the invention reflect an appreciation that a user is typically unable to view or make any changes to such settings until after the system completely boots and OS is in an active state. This inability can lead to inconveniences, such as a loud noise at start-up due to the device's default volume being too high, or the device's display automatically mirroring to a conference room's display, and in the process revealing confidential information. Another example is having to fully boot into a portable device's OS to determine its battery level. Accordingly, certain aspects of the invention reflect an appreciation that users generally desire faster, more efficient workflows, providing the information the user needs as they need it, when they need it.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 150, which is likewise accessible by a service provider server 152.

In certain embodiments, the information handling system 100 may likewise include system memory 112, firmware 114, and an ancillary system on a chip (SOC), which is interconnected to the foregoing via one or more buses 124. As used herein, a system on a chip (SOC) may be defined as an integrated processor system which includes at least a processor, random access memory and read only memory. In various embodiments, the SOC may be implemented within an integrated circuit. In various embodiments, the SOC may additionally include some or all of input/output ports, secondary storage, a radio modem and a graphic processing unit (GPU). In various embodiments, the system memory 112 may be implemented to include an operating system (OS) 118 and certain device drivers 116. In various embodiments, the system memory 112 may likewise be implemented to include certain software applications and services 120. In certain embodiments, the software applications and services 120 may include an intelligent connectivity system (ICS) 122, described in greater detail herein. In various embodiments, certain functionality of firmware 114 may be implemented in memory 112, using approaches familiar to skilled practitioners of the art.

In various embodiments, the ancillary SOC 130 may be implemented to include SOC memory 132 and certain firmware 134. In various embodiments, the SOC memory 132 may be implemented to include certain device drivers 136, a microcontroller OS 138, and certain software applications and services 140. In certain embodiments, the software applications and services 140 may include a control point system 142. In one embodiment, the information handling system 100 is able to download the control point system 142 from the service provider server 152.

In certain embodiments, the control point system 142 may be implemented to perform a pre-boot system configuration operation, described in greater detail herein. In certain embodiments, the control point system 142 may be implemented as an embedded controller. In certain embodiments, the pre-boot system configuration operation may be performed by the control point system 142 during operation of an information handling system 100. In certain embodiments, the performance of the pre-boot system configuration operation may result in the realization of improved operation of the information handling system 100, as described in greater detail herein.

Figure 2:
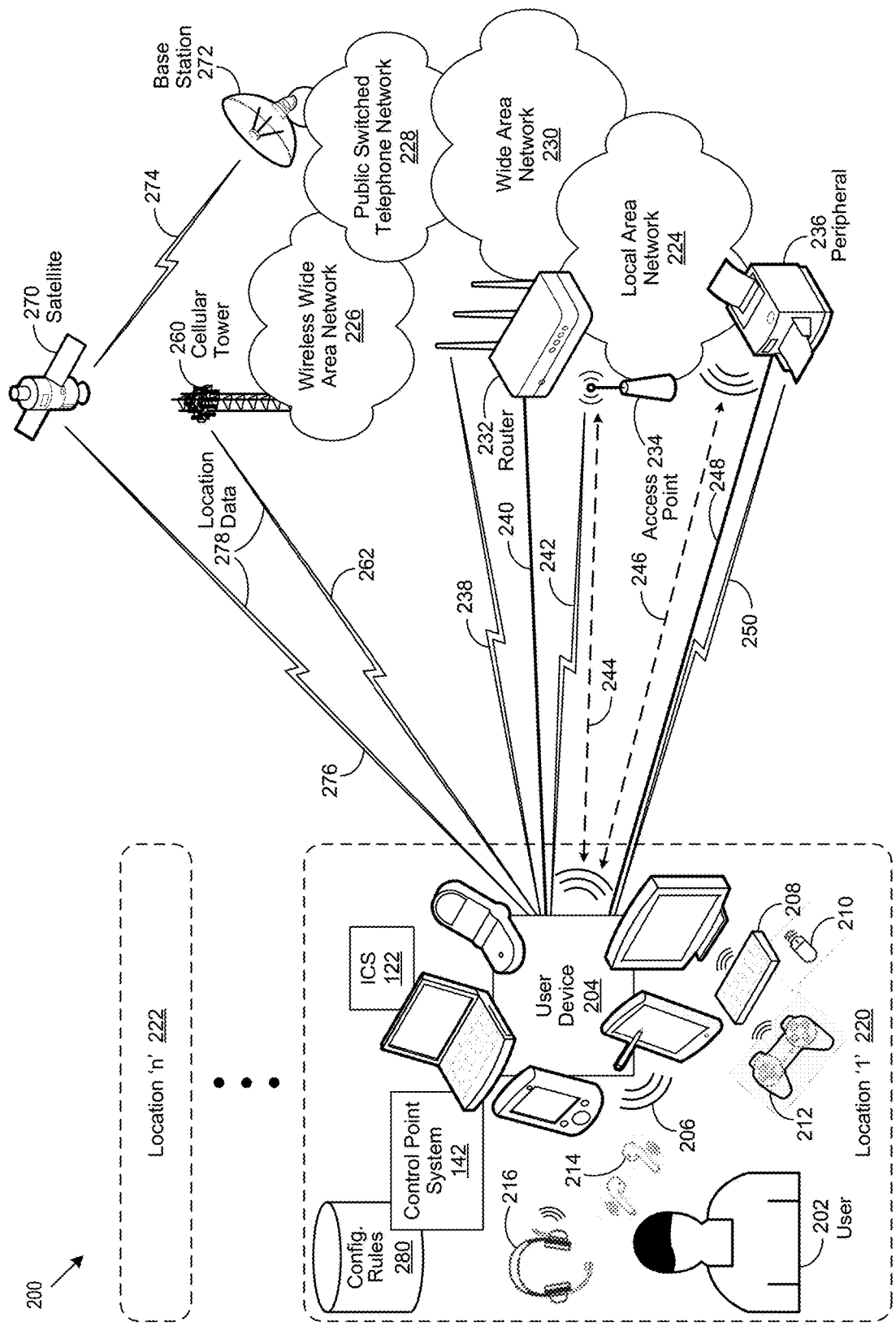
FIG. 2 is a block diagram of an intelligent connectivity environment.

FIG. 2 is a block diagram of an intelligent connectivity environment implemented in accordance with an embodiment of the invention. In certain embodiments, the intelligent connectivity environment 200 may include an intelligent connectivity system (ICS) 122, or a control point system 142, or both, as described in greater detail herein. In certain embodiments, the ICS 122 and the control point system 142 may be implemented on a user device 204. As used herein, a user device 204 broadly refers to an information handling system such as a personal computer, a laptop computer, a tablet computer, a personal digital assistant (PDA), a smart phone, a mobile telephone, or other device that is capable of communicating and processing data.

In certain embodiments, a user 202 may use the user device 204 to interact with the ICS 122 and the control point system 142. In certain embodiments, the ICS 122 may be implemented to perform an intelligent connectivity operation. As used herein, an intelligent connectivity operation broadly refers to any operation whose performance improves a user device's ability to utilize, as described in greater detail herein, network connectivity that may be available for provision by one or more networks.

In certain embodiments, the control point system 142 may be implemented to perform a pre-boot system configuration operation. As used herein, a pre-boot system configuration operation broadly refers to any operation performed to configure certain Basic Input/Output System (BIOS), or operating system (OS) parameters, or both, of a user device 204 prior to initiation of its boot sequence. In certain embodiments, one or more pre-boot system configuration operations may be performed to enable a particular system configuration mode, described in greater detail herein. In various embodiments, the control point system 142 may be implemented to use certain configuration rules 280 in the performance of a particular pre-boot system configuration operation.

In certain embodiments, a particular intelligent connectivity operation may be facilitated by the performance of one or more pre-boot system configuration operations to configure the user device 204 to automatically operate in a particular system configuration mode after it performs its boot sequence. As an example, one or more pre-boot system configuration operations may be performed to have the user device 204 automatically enter a collaboration system configuration mode when location 'n' 222 is determined to be a collaboration environment. In this example, being in a collaboration system configuration mode of operation may facilitate the ICS 122 in the performance of one or more intelligent connectivity operations to optimally utilize network connectivity options that may be available in the collaboration environment.

In certain embodiments, the intelligent connectivity environment 200 may include a Local Area Network (LAN) 224, a Personal Area Network (PAN) 206, a Wireless Local Area Network (WLAN), a Wireless Wide Area Network (WWAN) 226, a satellite 270 network, the public switched telephone network (PSTN) 228, and a Wide Area Network (WAN) 230, such as the Internet, or a combination thereof. In certain embodiments, the LAN 224 may be based upon one or more protocols, such as Ethernet, Asynchronous Transfer Mode (ATM), Token Ring, or Fiber Distributed Data Interface (FDDI). In certain embodiments, the PAN 206 may be based upon one or more protocols commonly associated with Bluetooth, ZigBee, or ultrawideband (UWB). In certain embodiments, the WLAN may be based upon one or more variants of the IEEE 802.11 wireless communication standard. In certain embodiments, the WWAN 226 may be based upon one or more generations of known cellular network protocols, commonly referred to as 3G, 4G, 5G, and so forth. In certain embodiments, the WAN 230 may be based upon one or more protocols, such as X.25, Frame Relay, Asynchronous Transfer Mode (ATM), or Telecommunications Protocol/Internet Protocol (TCP/IP).

In certain embodiments, the user device 204 may be implemented with communication hardware and software that allows it to communicate with one or more wirelessly-enabled input/output (I/O) devices via a PAN 206 network link. Examples of such wirelessly-enabled I/O devices include a keyboard 208, a mouse 210, a game controller 212, earphones or earbuds 214, a headset 216, and so forth. Skilled practitioners of the art will be familiar with a network link, which as commonly used, refers to the physical and logical network component used to interconnect hosts or nodes in a network. Those of skill in the art will likewise be aware that such network links are generally established through the link layer of a telecommunications protocol stack, such as the Internet protocol suite or the Open Systems Interconnection (OSI) model. As typically implemented, the link layer refers to a group of methods and communications protocols confined to the network link that a host, such as a particular user device 204. is physically connected to.

In certain embodiments, the user device 204 may be implemented with communication hardware and software that allows it to communicate with one or more access points 234 via a PAN 242 network link, or a WLAN 244 network link, or both. Skilled practitioners of the art will be familiar with a wireless access point (AP) 234, which generally refers to a networking hardware device that allows a wirelessly-enabled device, such as a particular user device 204, to connect to a wired network, such as a LAN 224. In various embodiments, the AP 234 may be implemented as a stand-alone device. In certain of these embodiments, the AP 234 may be implemented to connect to a router 232 through a LAN 224. In certain embodiments, the functionality of an AP 234 may be implemented as an integral component of the router 232.

In certain embodiments, the user device 204 may be implemented with communication hardware and software that allows it to communicate with one or more peripherals 236 via a PAN 246 network link, a LAN 248 network link, or a WLAN 250 network link, or a combination thereof. In certain embodiments, the user device 204 may be implemented with communication hardware and software that allows it to communicate with one or more routers 232 via a LAN 240 network link, or a WLAN 238 network link, or both. In certain embodiments, the user device 204 may be implemented with communication hardware and software that allows it to communicate with one or more WWAN 226 cellular towers 260 via a WWAN 262 network link. In certain embodiments, the user device 204 may be implemented with communication hardware and software that allows it to communicate with one or more satellites 270 via a satellite 276 network link.

In various embodiments, a particular cellular tower 260, or a particular satellite 270, or a combination of the two, may be implemented, individually or in combination, to provide certain location data 278, familiar to those of skill in the art, to the user device 204. In certain embodiments, the user device 204 may be configured to receive such location data 278, which is used as a data source for determining the user device's 204 location '1' 220 through 'n' 222. In certain embodiments, the location data 278 may include Global Position System (GPS) data provided by a GPS satellite 270. In certain embodiments (not shown), the location data 278 may include various Internet Protocol (IP) or other network address information assigned to the user device 204. In certain embodiments (not shown), the location data 278 may likewise be provided by a router 232, or an AP 234, or both.

In certain embodiments, one or more satellites 270 may be implemented to use known satellite communication protocols to establish a satellite network link 274 to a base station 272. In various embodiments, the base station 272 may in turn be implemented to be connected to the PSTN 228, which in certain embodiments may likewise be implemented to be connected to one or more WWANs 230, or one or more WANs 230, or a combination thereof. In various embodiments, one or more LANs 224 may be implemented to be connected to one or more WANs 230, or a combination thereof. In certain of these embodiments, one or more routers 232, may be implemented, individually or in combination, to connect a particular LAN 224 to a particular WAN 230.

In various embodiments, the ICS 122 may be implemented to establish a particular network link 206, 238, 240, 242, 244, 246, 248, 250, 262, 276 as the user device 204 moves from location '1' 220 to location 'n' 222. In certain of these embodiments, the establishment of a particular network link 206, 238, 240, 242, 244, 246, 248, 250, 262, 276 may be based upon the availability of connectivity to a corresponding network. In various embodiments, the ICS 122 may be implemented to switch from one network link 206, 238, 240, 242, 244, 246, 248, 250, 262, 276 to another. In certain of these embodiments, such switching may be based upon the respective signal strength, available bandwidth, network latency, or a combination thereof, associated with the availability of connectivity to a corresponding network.

In certain embodiments, the ICS 122 may be implemented to switch from one network link 206, 238, 240, 242, 244, 246, 248, 250, 262, 276 to another according to the user device 204 being present at a particular location '1' 220 through 'n' 222. In various embodiments, the ICS 122 may be implemented to establish two or more simultaneous network links 206, 238, 240, 242, 244, 246, 248, 250, 262, and 276. In certain of these embodiments, bandwidth respectively corresponding to the two or more network links 206, 238, 240, 242, 244, 246, 248, 250, 262, and 276 may be combined to provide aggregated network link bandwidth for use by the user device.

In various embodiments, the ICS 122 may be implemented to assign network connectivity corresponding to a particular software application, or a user device 204 process, to a particular network link 206, 238, 240, 242, 244, 246, 248, 250, 262, 276. In certain embodiments, the ICS 122 may be implemented to respectively assign two or more software applications, or user device 204 processes, to two or more network links 206, 238, 240, 242, 244, 246, 248, 250, 262, and 276 according to their corresponding attributes. For example, the ICS 122 may be implemented to assign a wireless-enabled gaming controller 212 to a PAN 206 link, while information generated and received by a game executing on the user device 204 may be assigned to WLAN 238 network link.

In certain of these embodiments, the respective assignment of two or more software applications, or user device 204 processes, or a combination thereof, to two or more network links 206, 238, 240, 242, 244, 246, 248, 250, 262, 276 may be according to the user device 204 being present at a particular location '1' 220 through 'n' 222. As an example, only a lower-speed (e.g., 300 Mbps) WLAN 238 network link may be available at location '1' 220, but both a high-speed (e.g., 100 Gbps) LAN 240 network link and a higher-speed (e.g., 1.7 Gbps) WLAN 238 network link may be available at location 'n' 222. In this example, the user 202 may wish to play a particular online game while simultaneously conducting an online chat session, whether they are at location '1' 220 or 'n' 222. To continue the example, it is possible that the bandwidth of the WLAN 238 network link at location '1' 220 may be barely adequate to support the network connectivity needs of the on-line game. As a result, the additional overhead of network traffic associated with the online chat session may result in the game not performing as responsively as desired.

However, the ICS 122 may be implemented to respectively assign the online chat session to the higher-speed WLAN 238 network link and the online game to the high-speed LAN 240 network link available at location 'n' 222. Accordingly, responsiveness of the online game will likely be improved due to the 100 Gbps speed provided by the LAN 238 network link available at location 'n' 220, while the online chat session will be adequately supported by the 1.7 Gbps speed of the WLAN 240 network link. Skilled practitioners of the art will recognize that many such embodiments and examples are possible. Accordingly, the foregoing is not intended to limit the spirit, scope or intent of the invention.

In certain embodiments, the ICS 122 may be implemented to establish and manage one or more virtual private network (VPN) connections on one or more corresponding network links. Skilled practitioners of the art will be familiar with a VPN, which as typically implemented, uses known tunneling protocols to extend a private network, such as a private LAN 224, across a public WAN 230, such as the Internet, to enable users 202 to use their user devices 204 to send and receive data to and from an external resource, such as a remote server, as if it was directly connected to the private network. Certain embodiments of the invention reflect an appreciation that a single VPN may not always be sufficient for a particular operational mode. Accordingly, in certain embodiments, the ICS 122 may likewise be implemented to perform a multi-link network traffic routing operation. As used herein, a multi-link traffic routing operation broadly refers to any operation performed to route network traffic across two or more network links.

Figure 3:
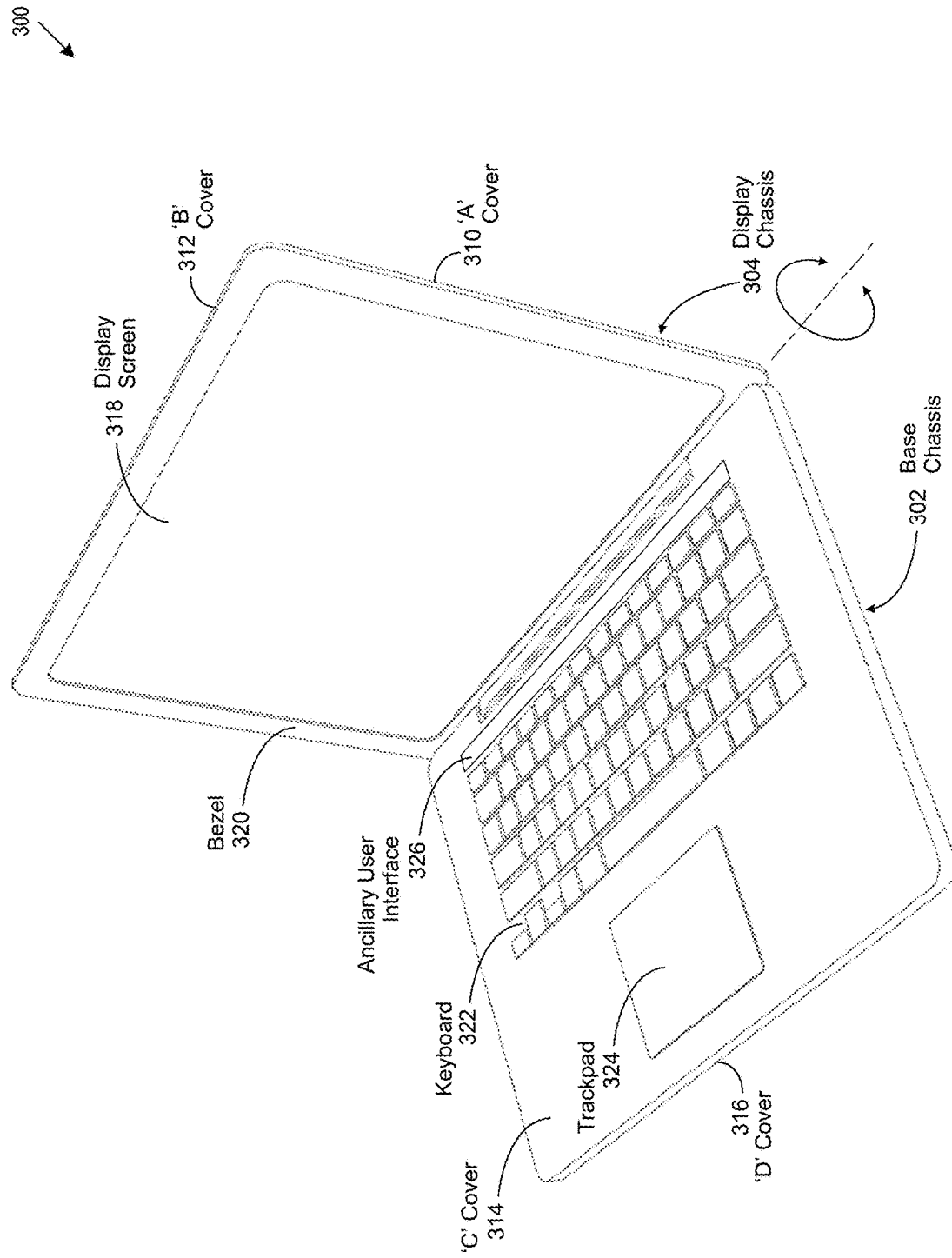
FIG. 3 shows a perspective view of an ancillary user interface implemented on an example portable information handling system.

FIG. 3 shows a perspective view of an ancillary user interface implemented in accordance with an embodiment of the invention on an example portable information handling system (IHS). It will be appreciated that some or all of the components of the IHS 100 described in the text associated with FIG. 1 may be included within the portable IHS 300 shown in FIG. 3. As shown in FIG. 3, the portable IHS 300 may be configured to include a base chassis 302 and a display chassis 304 shown in an open configuration. It will be appreciated that a closed configuration would have the display chassis 304 fully closed onto the base chassis 302.

In certain embodiments, the base chassis 302, or the display chassis 304 of the portable IHS 300, or the two combined, may comprise an outer case or shell. In certain embodiments, the portable IHS 300 may include a plurality of chassis portions. In certain embodiments, the portable IHS 300 may include some or all of an 'A' cover 310, a 'B' cover 312, a 'C' cover 314, and a 'D' cover 316. In certain embodiments, the 'A' cover 310 and the 'B' cover 312 may be configured to provide the display chassis 304. In certain embodiments, the 'C' cover 314 and the 'D' cover 316 may be configured to provide the base chassis 302.

In certain embodiments, the 'A' cover 310 may be configured to enclose a portion of the display chassis 304 of the IHS 300. In certain embodiments, the 'B' cover 312 may be configured to enclose another portion of the display chassis 304 of the IHS 300. In certain embodiments, the 'B' cover 312 may be configured to include a display screen 318 and an associated bezel 320.

In certain embodiments, the 'C' cover 314 may be configured to enclose a portion of the base chassis 302 of the IHS 300. In certain embodiments, the 'C' cover 314 may be configured to include a keyboard 322, a trackpad 324, an ancillary user interface (UI) 326, other input/output (I/O) devices (not shown), or a combination thereof. In certain embodiments (not shown) the ancillary UI 326 may be configured to be incorporated into the display screen 318, it's bezel 320, or the 'A' cover 310 of the portable IHS 300, or a combination thereof. In various embodiments, certain components of the portable IHS 300, such as a mother board, may be mounted within the 'C' cover 314. In certain embodiments, the 'D' cover 316 may be configured to enclose another portion of the base chassis 302 of the portable IHS 300.

In certain embodiments, the 'A' cover 310 may be configured to form a top outer protective shell, or a portion of a lid, for the portable IHS 300, while the 'D' cover 316 may be configured to form a bottom outer protective shell, or a portion of a base, for the portable IHS 300 when placed in a closed configuration. In certain embodiments, the 'A' cover 310 and the 'D' cover 316 may be substantively parallel to one another when in a fully closed configuration. In certain embodiments, both the 'A' cover 310 and the 'D' cover 316 may be comprised entirely of metal. In certain embodiments, the 'A' cover 310 and 'D' cover 316 may include both metallic and plastic components. For example, plastic components that are radio-frequency (RF) transparent may be used to form a portion of the 'A' cover 310.

In various embodiments, the 'A' cover 310 may be movably connected to a back edge of the 'D' cover 316 via one or more hinges. In certain of these embodiments, the hinges may be configured to allow the 'A' cover 310 to rotate from and to the 'D' cover 316, allowing for multiple orientations of the portable IHS 300. In certain embodiments, the portable IHS 300 may include a sensor to detect the orientation of the portable IHS 300 and activate or deactivate one or more antenna systems based on the occurrence of a particular orientation.

In certain embodiments, the portable IHS 300 may be a laptop with limited rotation of the 'A' cover 310 with regard to the 'D' cover 316, for example up to a 180 degree rotation arc. In certain embodiments the portable IHS 300 may be configured as a convertible IHS 300, with full rotation to a tablet configuration. In various embodiments, the portable IHS 300 may be configured as a tablet computer or a mobile phone. In certain of these embodiments (not shown), the keyboard 322, trackpad 324, display screen 318, bezel 320, and ancillary UI 326, of some combination thereof, may be integrated into the 'A' cover. In these embodiments, 'B' cover 310 and 'C' cover 314 are not implemented in the portable IHS 300, while the 'D' cover 316 may be implemented to form a bottom outer protective shell.

In various embodiments, the ancillary UI 326 may be implemented in the form of an adaptive row display (ARD). In certain of these embodiments, the ARD may be implemented to include a touch-capacitive screen, familiar to those of skill in the art, that is capable of displaying information in the form of text or icons, or a combination of the two. In certain embodiments, the touch-capacitive screen of such an ARD may be implemented to receive user input through a user gesture, such as a finger tap on a particular icon or text displayed within the ARD. In various embodiments, the ARD may be implemented in the shape of a bar. In certain embodiments, one or more ARD's may be placed on the surface of the 'C' cover 314 above the keyboard 322, on the surface of the 'B' cover within the bezel 320 or display screen 318, or on the surface of the 'A' cover 310 or 'D' cover 316, or a combination thereof.

In various embodiments, the ancillary UI 326 may be implemented to display certain information related to the system configuration mode, described in greater detail herein, the portable IHS 300 may be currently be in. In certain of these embodiments, the ancillary UI 326 may likewise be implemented to display one or more operational parameters associated with its current system configuration mode. In various embodiments, the ancillary UI 326 may be implemented to provide certain user input received from a user to a system control point 'A,' described in greater detail herein, that is executing on an associated ancillary system on a chip (SOC), likewise described in greater detail herein. In certain of these embodiments, as described in greater detail herein, the control point system 'A' may be implemented to use the provided user input to perform a pre-boot system configuration operation, likewise described in greater detail herein.

In various embodiments, the control point system 'A' may be implemented to provide certain information associated with the results of a particular pre-boot system configuration operation to the ancillary UI 326. In certain embodiments, the ancillary UI 326 may be implemented to display such information for a user to view. Skilled practitioners of the art will recognize that many such embodiments are possible. Accordingly, the foregoing is not intended to limit the spirit, scope, or intent of the invention.

FIG. 4 shows a simplified block diagram of interactions implemented in accordance with an embodiment of the invention between an ancillary system on a chip (SOC) and a primary SOC. In certain embodiments, an information handling system (IHS) 100, described in greater detail herein, may be configured to include a primary SOC 402 and an ancillary SOC 130. In various embodiments, the primary SOC 402 may be implemented to include memory 412, certain system and device firmware 'B' 414, and certain other components (not shown) familiar to skilled practitioners of the art. In certain embodiments, the memory 412 of the primary SOC 412 may be implemented to include certain system and device drivers 416, an operating system (OS) 418, and certain software applications and services 420. In various embodiments, some or all of the functionality provided by the primary SOC may be provided by certain discrete components (e.g., central processing unit, various input/output ports, etc.) of the IHS 100 described in the text associated with FIG. 1.

In various embodiments, the ancillary SOC 130 may be implemented to include certain system and device firmware 134, certain device drivers 136, an ancillary SOC microcontroller OS 138, SOC memory 132, and certain other SOC components (not shown) familiar to those of skill in the art. In certain embodiments, the SOC memory 132 may be implemented to include certain software applications and services 140. In certain embodiments, the software applications and services 140 may be implemented to include a control point system 'A' 142.

In various embodiments, the control point system 'A' 142 may be implemented to receive certain user input, described in greater detail herein. In various embodiments, the control point system 'A' 142 may be implemented to use such user input to interact with certain system and device firmware 'B' 414, as described in greater detail herein, during the performance of a pre-boot system configuration operation, likewise described in greater detail herein. In certain embodiments, as likewise described in greater detail herein, the performance of one or more pre-boot system configuration operations may result in changing the current configuration mode of an IHS 100 to a different configuration mode prior to it initiating its boot sequence.

FIGS. 5a and 5b show a table of example information handling system (IHS) system configuration modes implemented in accordance with an embodiment of the invention and their associated system attributes and operational parameters. In various embodiments, one or more pre-boot system configuration operations, described in greater detain herein, may be performed to change the current system configuration mode 502 of an information handling system (IHS) to another system configuration mode 502 prior to it initiating its boot sequence. In these embodiments, each system configuration mode 502 may have certain associated system attributes 504 and operational parameters 506.

As an example, a power optimized 508 system configuration mode 502 may have system attributes 504 that include low battery power, not being connected to an external power source, being located in a relatively new location or environment (e.g., a collaboration room), or having multiple events (e.g., videoconferencing, texting, etc.) scheduled to be performed in the near term, or a combination thereof. To continue the example, the power optimized 508 system configuration mode 502 may likewise have operational parameters 506 that include decreasing the display refresh rate and brightness, switching to a different color profile, disabling stereo sound, pausing background system tasks, or changing the power profile to conserve power, or a combination thereof. As another example, a performance optimized 510 system configuration mode 502 may have system attributes 504 that include being in either a home or work environment, not being connected to an external power source, camera focus mode enabled, or active gaming activity, or a combination thereof. To continue the example, the performance optimized 510 system configuration mode 502 may likewise have operational parameters 506 that include increasing the display refresh rate and brightness if currently reduced, switching to a different color profile, enabling stereo sound, initiating background system tasks, or changing the power profile to provide the best performance, or a combination thereof.

As yet another example, a privacy optimized 512 system configuration mode 502 may have system attributes 504 that include detecting that more than one user is in proximity to the IHS, detecting high background noise, detecting that the number of proximate users is changing frequently, or detecting a new environment, or a combination thereof. To continue the example, the privacy optimized 512 system configuration mode 502 may likewise have operational parameters 506 that include enabling a privacy screen, closing the camera shutter, minimizing sound volume, or muting the microphone, or a combination thereof. As yet still another example, an entertainment 514 system configuration mode 502 may have system attributes 504 that include the consumption of entertainment content, or one-time or recurring entertainment usage, or both. To continue the example, the entertainment 514 system configuration mode 502 may likewise have operational parameters 506 that include increasing the display refresh rate and brightness if currently reduced, switching to an entertainment-oriented color profile, enabling stereo sound, or prioritizing entertainment traffic over a wireless communication connection, or a combination thereof.

As an additional example, a collaboration 516 system configuration mode 502 may have system attributes 504 that include detection of a collaboration environment, detecting the presence of more than one user, detecting low environment background noise, or detecting that the number of users in proximity to the IHS is not changing frequently, or a combination thereof. To continue the example, the collaboration 516 system configuration mode 502 may likewise have operational parameters 506 that include enabling stereo sound, setting the volume to an optimal level for the environment, unmuting the microphone, starting a live camera feed, setting display settings to extend mode, or disabling a privacy screen, or a combination thereof. As another example, a fast boot 518 system configuration mode 502 may have system attributes 504 that include initiating the start-up of the IHS at a non-standard time, such as during a commute, detecting the user's intent to only perform one or two tasks, and so forth. To continue the example, the fast boot 518 system configuration mode 502 may likewise have operational parameters 506 that include disabling start-up applications and system background tasks, delaying full boot-up of certain hardware components, or changing the default display refresh rate, or a combination thereof.

As yet another example, a system status 520 system configuration mode 502 may have system attributes 504 that include checking on the operational status of certain IHS components, such as wireless connectivity, display properties, microphone and speaker volumes, camera mode, or privacy screen, or a combination thereof. To continue the example, the system status 520 system configuration mode 502 may likewise have operational parameters 506 that include displaying the operational status of certain IHS components on an IHS user interface (UI), such as an adaptive row display (ARD), described in greater detail herein, without needing to boot the IHS. Skilled practitioners of the art will recognize that many such examples of system configuration modes 502, and their associated system attributes and operational parameters 506, are possible. Accordingly, the foregoing is not intended to limit the spirit, scope, or intent of the invention.

Figure 6:
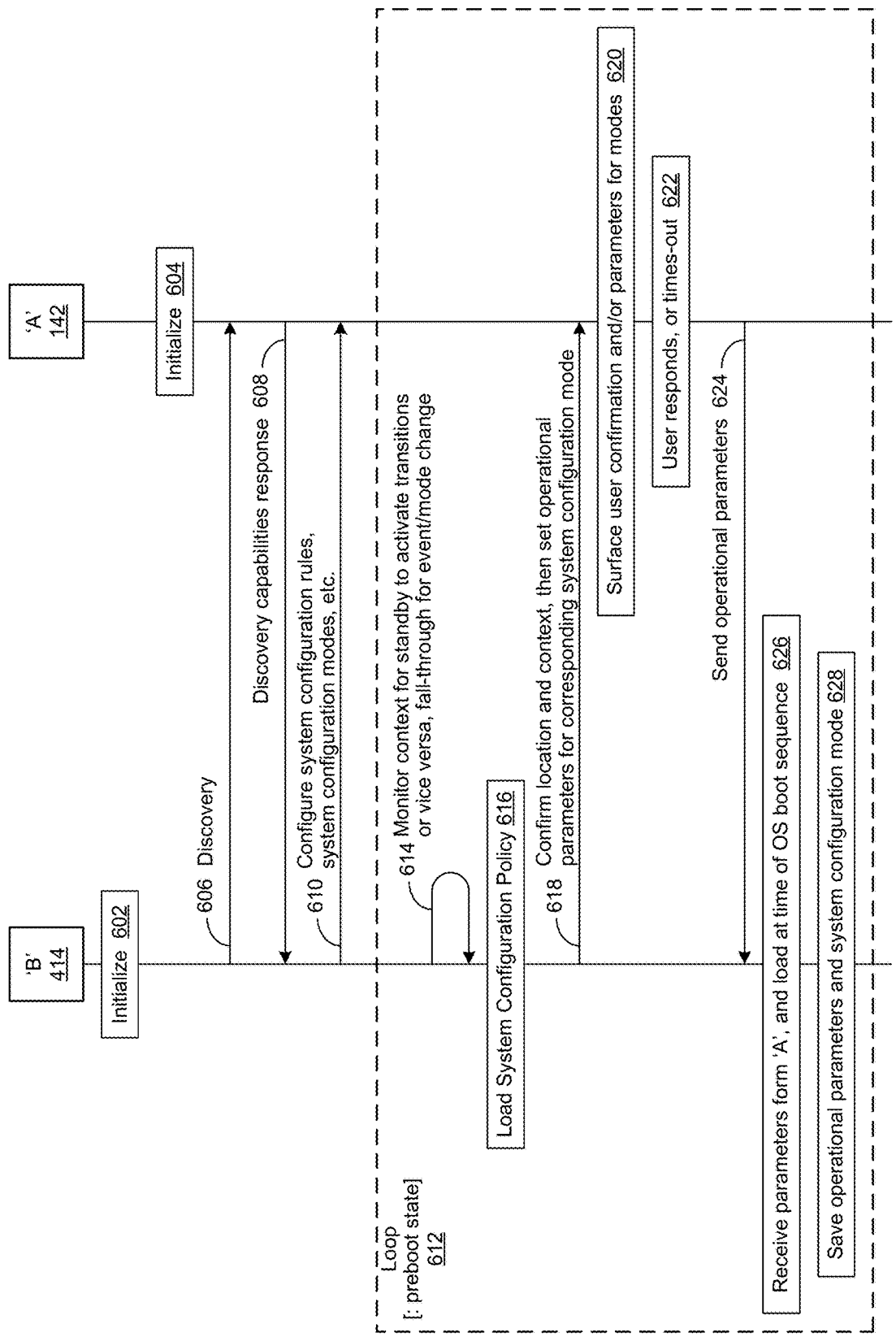
FIG. 6 shows process flows associated with the performance of pre-boot system configuration operations.

FIG. 6 shows process flows associated with the performance of pre-boot system configuration operations implemented in accordance with an embodiment of the invention. In certain embodiments, information handling system (IHS) firmware 'B' 414 may be implemented on a primary system on a chip (SOC), while control point system 'A' 142 may be implemented on an ancillary SOC, as described in greater detail herein. In this embodiment, pre-boot system configuration operations are begun by IHS firmware 'B' 414 and the control point system 'A' 142 being sequentially initialized in steps 602 and 604. Then, in step 606, IHS firmware 'B' 414 performs a discovery operation to discover the capabilities of control point system 'A' 142. In response, the control point system 'A' 142 provides its capabilities to IHS firmware 'B' 142 in step 608. In turn, IHS firmware 'B' 414 configures system configuration rules, system configuration modes, and so forth, and then provides them to the control point system 'A' in step 610.

Ongoing steady-state loop operations 612 are then initiated, followed by IHS firmware 'B' 414 monitoring the context of the IHS's location and context in step 614 to activate transitions from one system configuration to another. As changes in the IHs's location and context occur, an associated system configuration policy 616, described in greater detail herein, is loaded. Once loaded, the IHS's location and context is confirmed, and the previously loaded system configuration policy is used in step 618 to set certain operational parameters for the IHS, based upon a corresponding system configuration mode.

Once the operational parameters are set, they are displayed to the user through a user interface (UI) in step 620. In certain embodiments, the UI may be implemented as an adaptive row display (ARD), described in greater detail herein. In turn, the user responds by accepting what it displayed within the UI in step 622, or alternatively, what is displayed times-out if not accepted. Once accepted, the operational parameters corresponding to the selected system operational mode are sent to the IHS firmware 'B' 414 in step 624, where they are loaded in step 626 when the operating system (OS) boot sequence is initiated. Thereafter, the current system operational mode and its associated operational parameters are saved to the IHS firmware 414 in step 628.

As an example of the foregoing, prior to initiating an OS boot sequence, the IHS firmware 'B' 414 may receive certain information associated with the context of a particular location. To continue the example, the user and their IHS may be in a collaboration room. In this example, the method by which the location of the user and their IHS is determined, and the method by which the IHS firmware 'B' 414 receives such information, is a matter of design choice.

To continue the example yet further, the IHS firmware 'B' 414 may determine that a privacy system configuration mode is most appropriate, with the IHS's privacy screen, audio mute, and video enabled. If so, then it sends the proposed system configuration mode and its associated operational parameters to the control point system "A" 142. Once the operational parameters are received by the control point system 'A' 142, they are displayed within a UI implemented on the IHS and the user is prompted for confirmation. In various embodiments, the user may be allowed to override certain operational parameters. Once the operational parameters are confirmed, the control point system 'A' 142 communicates the confirmation to the IHS firmware 'B' 414, which uses the operational parameters to initiate an OS boot sequence.

Figure 7A:
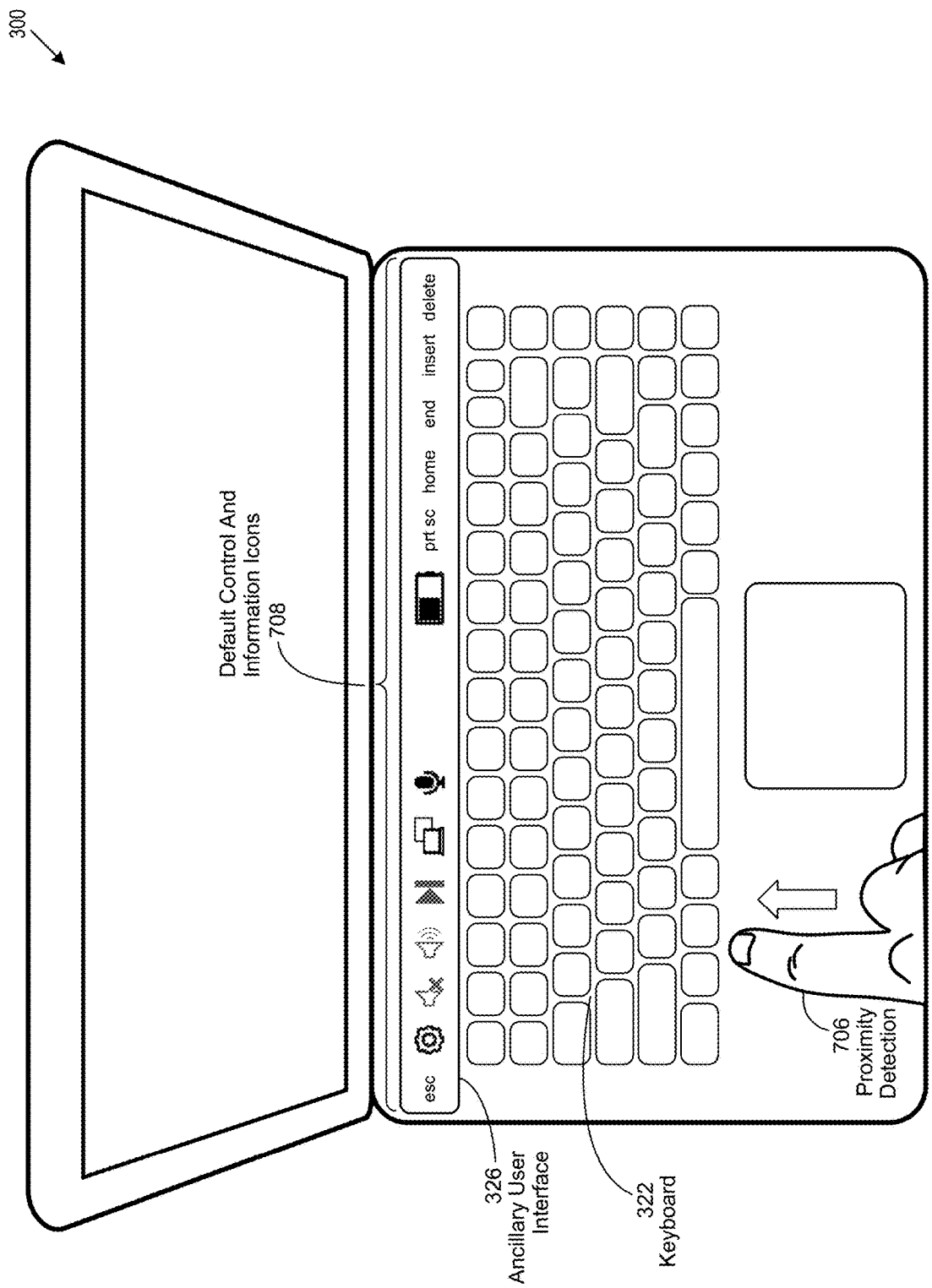
FIGS. 7a through 7e show the performance of certain pre-boot system configuration operations.

FIGS. 7a through 7e show the performance of certain pre-boot system configuration operations implemented in accordance with an embodiment of the invention. In this embodiment, an ancillary user interface (UI) 326 may be implemented as an adaptive row display (ARD), described in greater detail herein. As shown in FIG. 7a, the ancillary UI 326 may be implemented to display default control and information icons 708, as well as detect the proximity 706 of a human extremity, such as a finger.

Figure 7B:
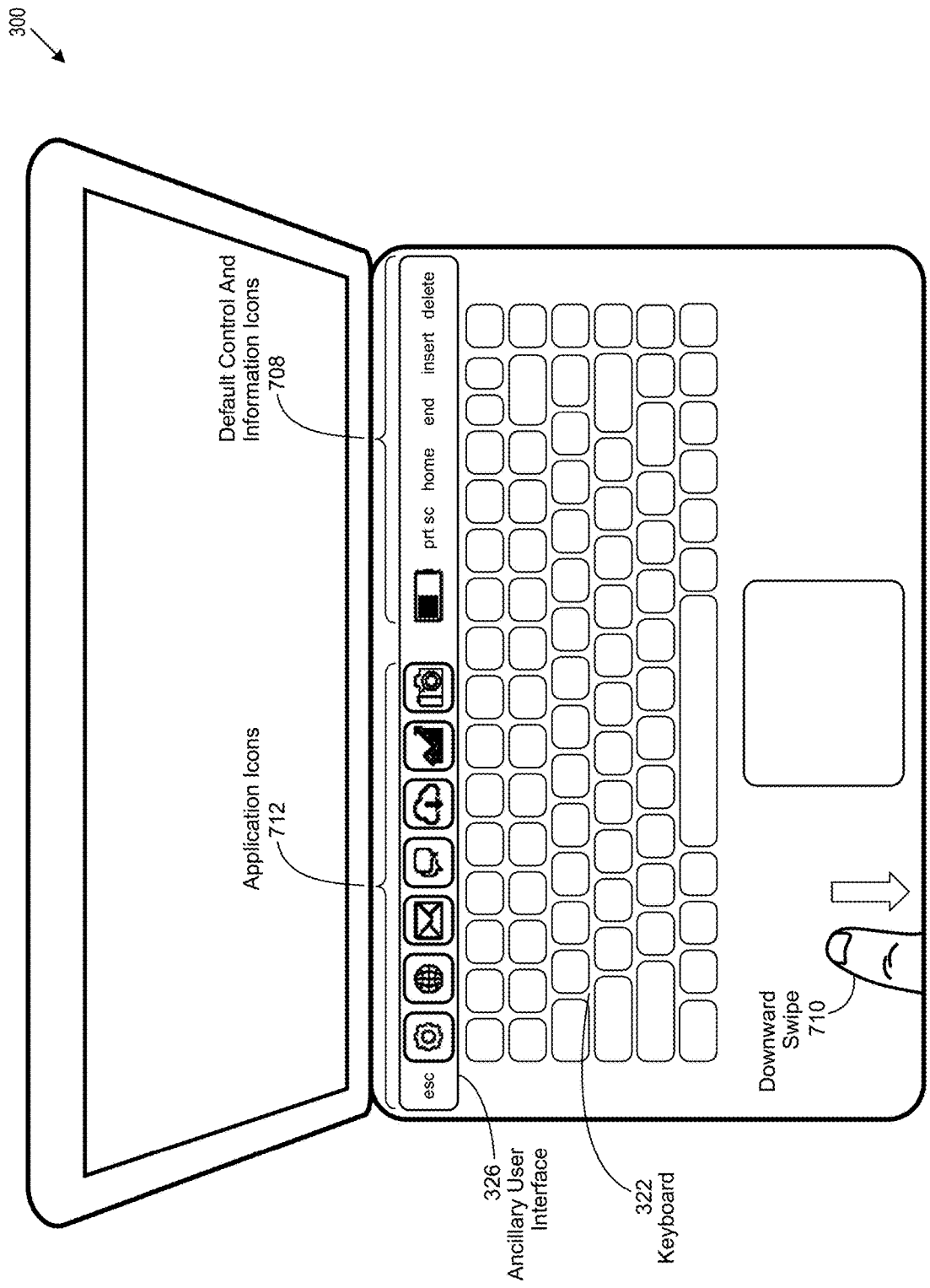
Figure 7C:
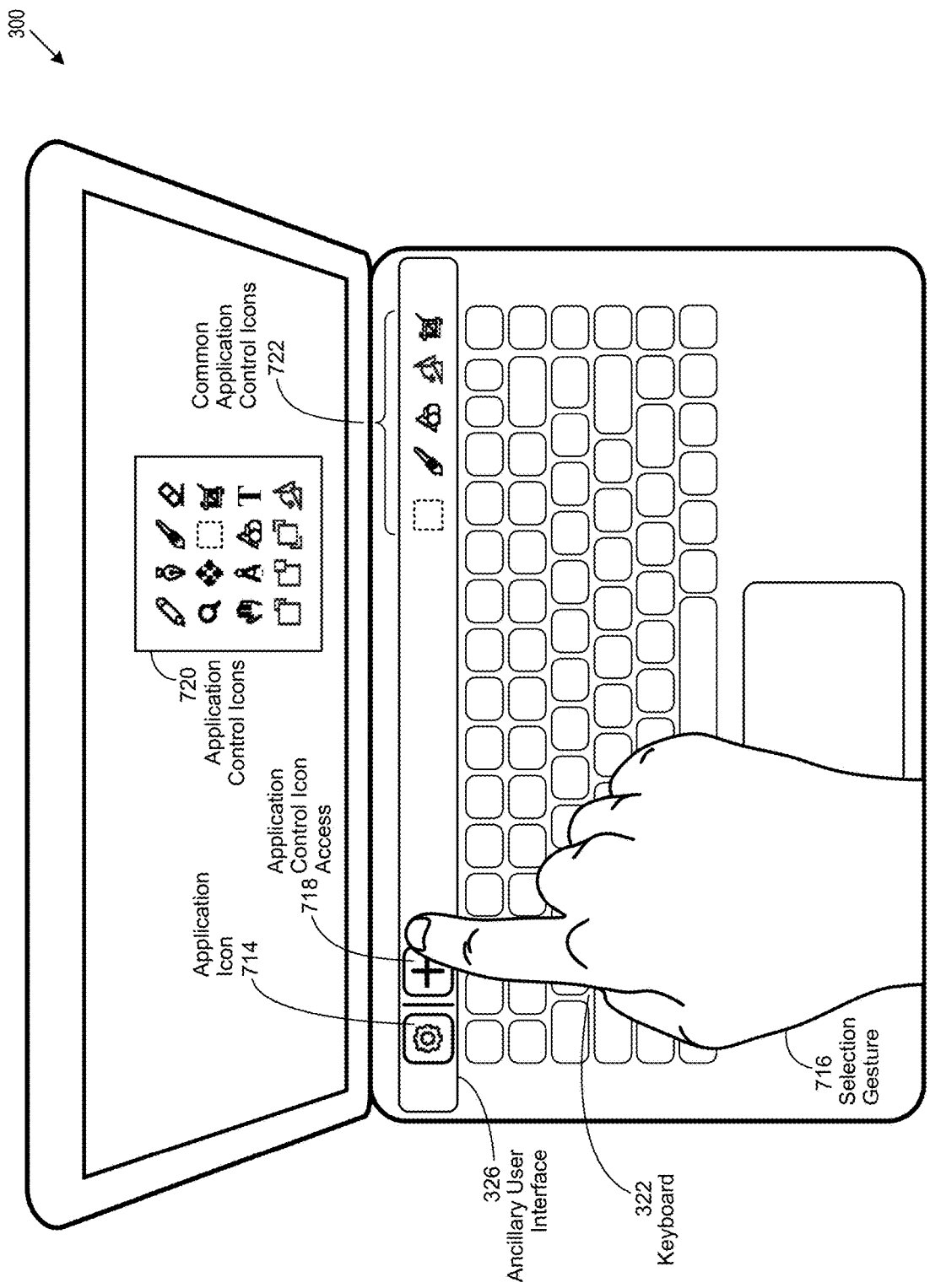

As shown in FIG. 7b, the ancillary UI 326 may likewise be implemented to detect certain user gestures, such as a downward swipe 710 of a user's finger. In this embodiment, such a user gesture may result in the display of certain application icons 712, as well as retaining the display of certain default control and information icons 708. Referring now to FIG. 7c, the ancillary UI 326 may be implemented to recognize a selection gesture 716 to select an application selection icon 714, an application control icon access icon 718, or one or more common application control icons 722. For example, using a selection gesture 716 to select the application control icon access icon 718 results in the display of one or more application control icons 720.

Figure 7D:
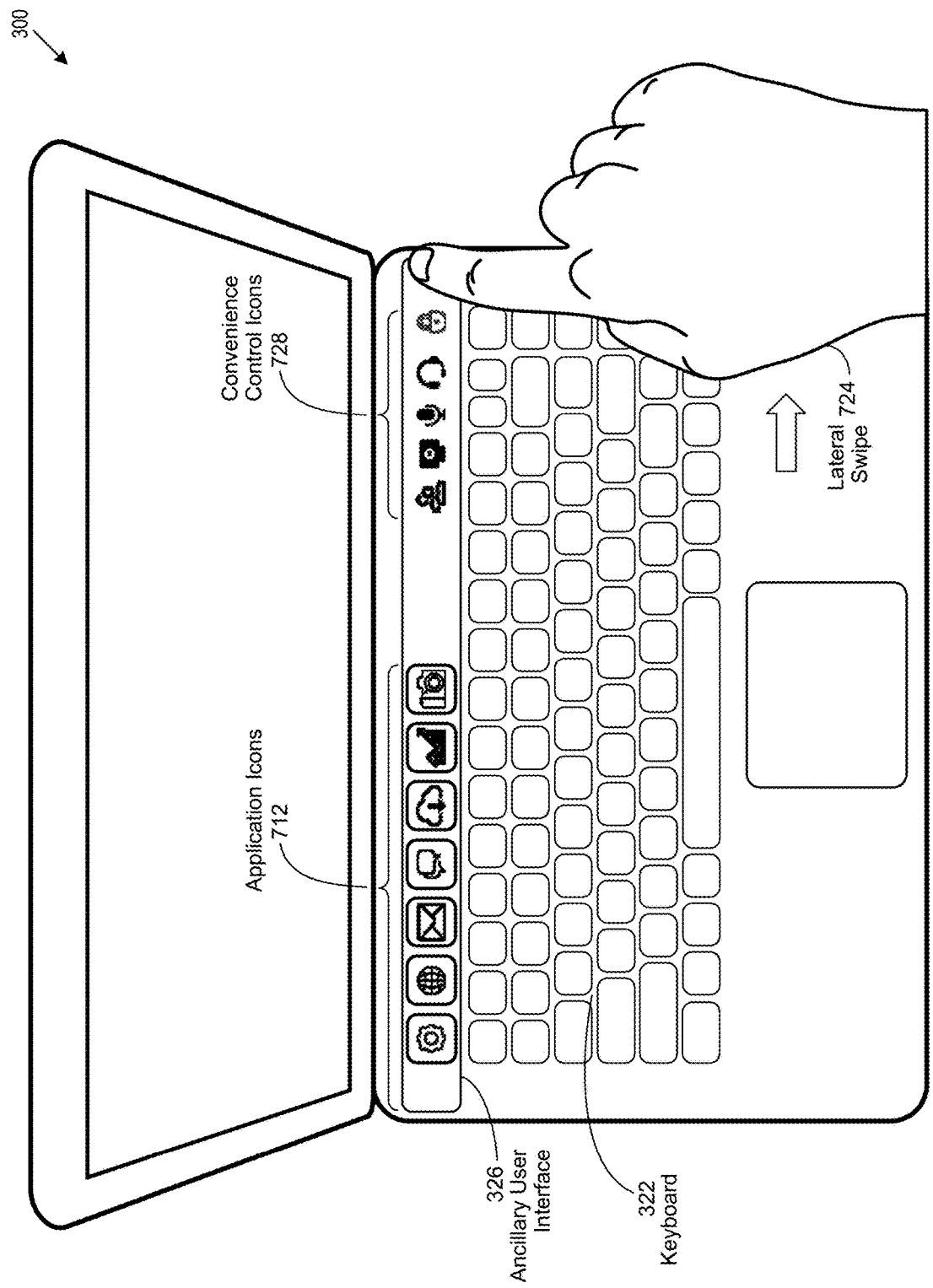
Figure 7E:
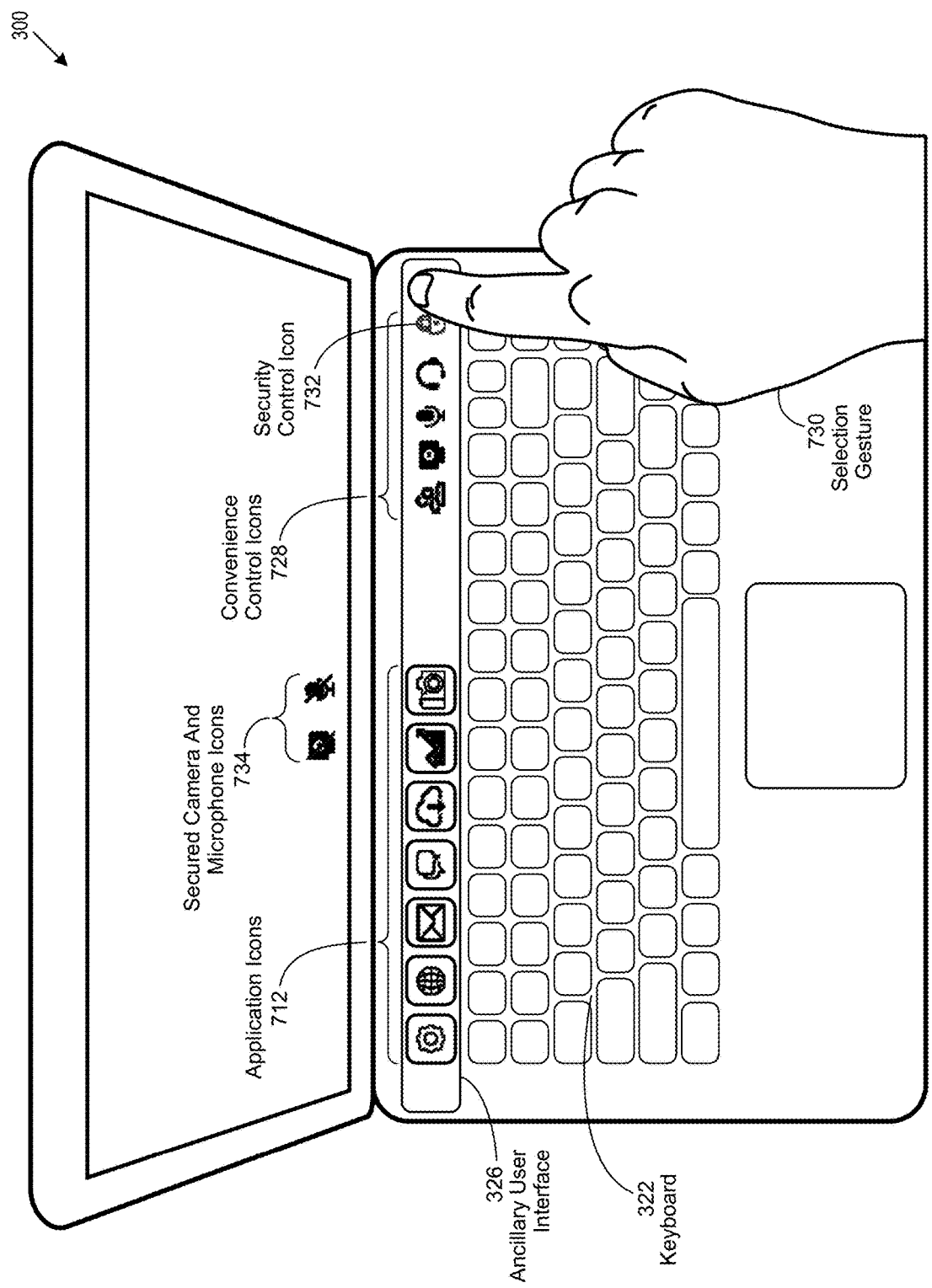

As shown in FIG. 7d, the ancillary UI 326 may be implemented recognize a particular user gesture, such as a lateral swipe 724, which may result in the display of one or more application icons 712, one or more convenience control icons 728, or a combination thereof. Referring to FIG. 7e, the ancillary UI 326 may be implemented to recognize a selection gesture 730, which can be used to select a particular convenience control icon 728, such a security control icon 732, which may be implemented to control the operational status of an associated camera and microphone. As an example, the user device 300 shown in FIG. 7e may currently be in a privacy optimized system configuration mode. Accordingly, as indicated by the secured camera and microphone icons 734, the user device 300 has completed its boot sequence with its camera shuttered and its microphone muted, as described in greater detail herein. Skilled practitioners of the art will recognize that many such embodiments and examples are possible. Accordingly, the foregoing is not intended to limit the spirit, scope, or intent of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system."

Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a pre-boot system configuration operation, comprising:
   providing an information handling system with a primary integrated processor system and an ancillary integrated processor system, the primary integrated processor system being contained within a primary system on a chip (SoC), the primary integrated processor system having associated primary device firmware and associated primary device drivers, the ancillary integrated processor system being contained within an ancillary system on a chip (ancillary SoC), the ancillary SoC comprising a SoC memory, the SoC memory including a control point system, ancillary device firmware and ancillary device drivers, the control point system executing on the ancillary integrated processor system to perform a pre-boot system configuration operation, the control point system interacting with the ancillary device firmware and the ancillary device drivers;
   performing the pre-boot system configuration operation using the control point system executing on the ancillary integrated processor system, the pre-boot system configuration operation configuring certain parameters prior to initiation of a primary system boot operation, the pre-boot system configuration operation changing a current system configuration mode of the information handling system to another system configuration mode prior to initiating a boot sequence of the information handling system; and,
   configuring the information handling system to automatically operate in a particular system configuration mode after performance of the pre-boot system configuration operation, the particular system configuration mode corresponding to the another system configuration mode.

2. The method of claim 1, wherein:
   the particular system configuration mode includes a power optimized configuration mode, a performance optimized configuration mode, a privacy optimized configuration mode, an entertainment configuration mode, a collaboration configuration mode, a fast boot configuration mode and a system status configuration mode; and,
   the power optimized configuration mode having associated power optimized system attributes and associated power optimized operational parameters, the performance optimized configuration mode having associated performance optimized system attributes and associated performance optimized operational parameters, the privacy optimized configuration mode having associated privacy optimized system attributes and associated privacy optimized operational parameters, the entertainment configuration mode having associated entertainment configuration system attributes and associated entertainment configuration operational parameters, the collaboration configuration mode having associated collaboration configuration system attributes and associated entertainment configuration operational parameters, the fast boot configuration mode having associated fast boot system attributes and associated fast boot operational parameters and system status configuration mode having associated system status system attributes and associated system status operational parameters.

3. The method of claim 1, wherein:
   the particular system configuration mode includes configuration of an ancillary user interface (UI).

4. The method of claim 3, wherein:
   the ancillary UI is implemented as an adaptive row display.

5. The method of claim 1, wherein:
   the control point system instantiated within the ancillary integrated processing system interacts with the associated primary device firmware of the primary integrated processing system.

6. The method of claim 5, wherein:
   the control point system is implemented within an embedded controller contained within the ancillary SoC.

7. A system comprising:
   a primary integrated processor system, the primary integrated processor system being contained within a primary system on a chip (SoC), the primary integrated processor system having associated primary device firmware and associated primary device drivers;
   an ancillary integrated processor system, the ancillary integrated processor system being contained within an ancillary system on a chip (ancillary Soc), the ancillary SoC comprising a SoC memory, the SoC memory including a control point system, ancillary device firmware and ancillary device drivers, the control point system executing on the ancillary integrated processor system to perform a pre-boot system configuration operation, the control point system interacting with the ancillary device firmware and the ancillary device drivers;
   a data bus coupled to a processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   performing the pre-boot system configuration operation using the control point system executing on the ancillary integrated processor system, the pre-boot system configuration operation configuration certain parameters prior to initiation of a primary system boot operation, the pre-boot system configuration operation changing a current system configuration mode of the information handling system to another system configuration mode prior to initiating a boot sequence of the information handling system; and,
   configuring the information handling system to automatically operate in a particular system configuration mode after performance of the pre-boot system configuration operation, the particular system configuration mode corresponding to the another system configuration mode.

8. The system of claim 7, wherein:
the particular system configuration mode includes a power optimized configuration mode, a performance optimized configuration mode, a privacy optimized configuration mode, an entertainment configuration mode, a collaboration configuration mode, a fast boot configuration mode and a system status configuration mode; and,
the power optimized configuration mode having associated power optimized system attributes and associated power optimized operational parameters, the performance optimized configuration mode having associated performance optimized system attributes and associated performance optimized operational parameters, the privacy optimized configuration mode having associated privacy optimized system attributes and associated privacy optimized operational parameters, the entertainment configuration mode having associated entertainment configuration system attributes and associated entertainment configuration operational parameters, the collaboration configuration mode having associated collaboration configuration system attributes and associated entertainment configuration operational parameters, the fast boot configuration mode having associated fast boot system attributes and associated fast boot operational parameters and system status configuration mode having associated system status system attributes and associated system status operational parameters.

9. The system of claim 7, wherein:
the particular system configuration mode includes configuration of an ancillary user interface (UI).

10. The system of claim 9, wherein:
the ancillary UI is implemented as an adaptive row display.

11. The system of claim 7, wherein:
the control point system instantiated within the ancillary integrated processing system interacts with the associated primary device firmware of the primary integrated processing system.

12. The system of claim 11, wherein:
the control point system is implemented within an embedded controller contained within the ancillary SoC.

13. A non-transitory, computer-readable storage medium embodying computer program code, the computer program code comprising computer executable instructions configured for:
performing a pre-boot system configuration operation using an ancillary integrated processor system, the pre-boot system configuration operation configuring certain parameters prior to initiation of a primary system boot operation, the primary integrated processor system being contained within a primary system on a chip (SoC), the primary integrated processor system having associated primary device firmware and associated primary device drivers, the ancillary integrated processor system being contained within an ancillary system on a chip (ancillary SoC), the ancillary SoC comprising a SoC memory, the SoC memory including a control point system, ancillary device firmware and ancillary device drivers, the control point system executing on the ancillary integrated processor system to perform the pre-boot system configuration operation, the pre-boot system configuration operation changing a current system configuration mode of the information handling system to another system configuration mode prior to initiating a boot sequence of the information handling system, the control point system interacting with the ancillary device firmware and the ancillary device drivers; and,
configuring an information handling system to automatically operate in a particular system configuration mode after performance of the pre-boot system configuration operation, the particular system configuration mode corresponding to the another system configuration mode.

14. The non-transitory, computer-readable storage medium of claim 13, wherein:
the particular system configuration mode includes a power optimized configuration mode, a performance optimized configuration mode, a privacy optimized configuration mode, an entertainment configuration mode, a collaboration configuration mode, a fast boot configuration mode and a system status configuration mode; and,
the power optimized configuration mode having associated power optimized system attributes and associated power optimized operational parameters, the performance optimized configuration mode having associated performance optimized system attributes and associated performance optimized operational parameters, the privacy optimized configuration mode having associated privacy optimized system attributes and associated privacy optimized operational parameters, the entertainment configuration mode having associated entertainment configuration system attributes and associated entertainment configuration operational parameters, the collaboration configuration mode having associated collaboration configuration system attributes and associated entertainment configuration operational parameters, the fast boot configuration mode having associated fast boot system attributes and associated fast boot operational parameters and system status configuration mode having associated system status system attributes and associated system status operational parameters.

15. The non-transitory, computer-readable storage medium of claim 13, wherein:
the particular system configuration mode includes configuration of an ancillary user interface (UI).

16. The non-transitory, computer-readable storage medium of claim 15, wherein:
the ancillary UI is implemented as an adaptive row display.

17. The non-transitory, computer-readable storage medium of claim 13, wherein:
the pre-boot system configuration operation is preformed via a control point system instantiated within the ancillary integrated processing system, the control point system instantiated within the ancillary integrated processing system interacting with the associated primary device firmware of the primary integrated processing system.

18. The non-transitory, computer-readable storage medium of claim 17, wherein:
the control point system is implemented within an embedded controller contained within the ancillary SoC.

19. The non-transitory, computer-readable storage medium of claim 13, wherein:
the computer executable instructions are deployable to a client system from a server system at a remote location.

20. The non-transitory, computer-readable storage medium of claim 13, wherein:
  the computer executable instructions are provided by a service provider to a user on an on-demand basis.

* * * * *